United States Patent [19]

Milton

[11] Patent Number: 5,172,576
[45] Date of Patent: Dec. 22, 1992

[54] ANTI-THEFT STEERING SHAFT LOCK

[75] Inventor: Thomas J. Milton, Bay City, Mich.

[73] Assignee: General Motors Corporation, Detroit, Mich.

[21] Appl. No.: 832,872

[22] Filed: Feb. 10, 1992

[51] Int. Cl.$^5$ .................................... B60R 25/02
[52] U.S. Cl. ........................... 70/185; 70/252; 74/492; 74/99 A; 74/109; 192/93 A
[58] Field of Search ............. 74/484 R, 492, 99 A, 74/109; 70/184, 185, 186, 252; 192/93 R, 93 A

[56] References Cited

U.S. PATENT DOCUMENTS

| | | | |
|---|---|---|---|
| 1,155,902 | 10/1915 | Edey | 70/184 |
| 1,216,351 | 2/1917 | Nutt | 70/184 X |
| 1,341,281 | 5/1920 | Randolph | 70/182 X |
| 1,381,000 | 6/1921 | Mueller | 70/189 X |
| 1,487,863 | 3/1924 | Lavigne | 70/183 |
| 1,855,697 | 4/1932 | Sullivan | 192/93 A X |
| 3,566,633 | 3/1971 | Borck | 70/252 |
| 3,566,634 | 3/1971 | Borck | 70/252 |
| 3,732,710 | 5/1973 | Rhodes et al. | 70/239 |
| 4,552,000 | 11/1985 | Lipschutz | 70/185 |
| 4,559,795 | 12/1985 | Zagoroff | 70/422 |
| 4,570,468 | 2/1986 | Bemm et al. | 70/252 |
| 4,750,380 | 6/1988 | Hoblingre et al. | 74/556 |
| 4,903,511 | 2/1990 | Niedzielski et al. | 70/252 |

Primary Examiner—Richard Lorence
Attorney, Agent, or Firm—Saul Schwartz

[57] ABSTRACT

An anti-theft steering shaft lock on an automotive steering column including a first clutch element on a rotatable steering shaft and a second clutch element on a stationary part of the steering column. The first clutch element has notches accessible in the direction of the centerline of the steering shaft and the second clutch element has axial lugs for engagement in the notches. The second clutch element is mounted on the stationary part of the steering column for bodily movement in the direction of the centerline of the steering shaft between locked and unlocked positions relative to the first clutch element. An annular control element is rotatably supported on the stationary part of the steering column around the second clutch element and has a circumferential cam slot which receives a radial lug on the second clutch element such that rotation of the control element effects bodily shiftable movement of the second clutch element between its locked and unlocked positions. An actuating system on the stationary part of the steering column for rotating the control element includes a cylinder lock and a double rack and pinion.

6 Claims, 3 Drawing Sheets

ANTI-THEFT STEERING SHAFT LOCK

FIELD OF THE INVENTION

This invention relates to anti-theft steering shaft locks for automotive steering columns.

BACKGROUND OF THE INVENTION

U.S. Pat. No. 4,903,551, issued Feb. 27, 1990 and assigned to the assignee of this invention, describes an axial engagement type anti-theft steering shaft lock for an automotive steering column including a stationary first clutch element on the steering column and a second clutch element on the steering shaft rotatable with the latter and shiftable in the direction of the centerline of the shaft into and out of engagement with the first clutch element. The second clutch element is shifted back and forth by a fork on the steering column engaging a circumferential groove on the second clutch element. An anti-theft steering shaft lock according to this invention is a compact alternative to the anti-theft steering shaft lock described in the aforesaid U.S. Pat. No. 4,903,551.

SUMMARY OF THE INVENTION

This invention is a new and improved axial engagement type anti-theft steering shaft lock for an automotive steering column including a first clutch element rotatable with a steering shaft of the steering column and a second clutch element supported on the steering column for bodily movement in the direction of the centerline of the steering shaft into and out locking engagement with the first clutch element. The second clutch element is restrained against rotation on the steering column by a pair of radial lugs on the clutch element slidably received in grooves in the steering column parallel to the centerline of the steering shaft. An annular control element around the second clutch element includes a pair of diametrically opposite cam slots in a wall thereof which slidably receive the radial lugs on the second clutch element such that when the control ring rotates, the second clutch element is shifted back and forth into and out of engagement with the first clutch element. A rack bar on the steering column meshes with a pinion gear connected to a cylinder lock barrel on the steering column and with pinion gear teeth on the control element such that rotation of the cylinder lock barrel rotates the control element to shift the second clutch element into and out of engagement with the first clutch element.

DESCRIPTION OF A PREFERRED EMBODIMENT

Figure 1:
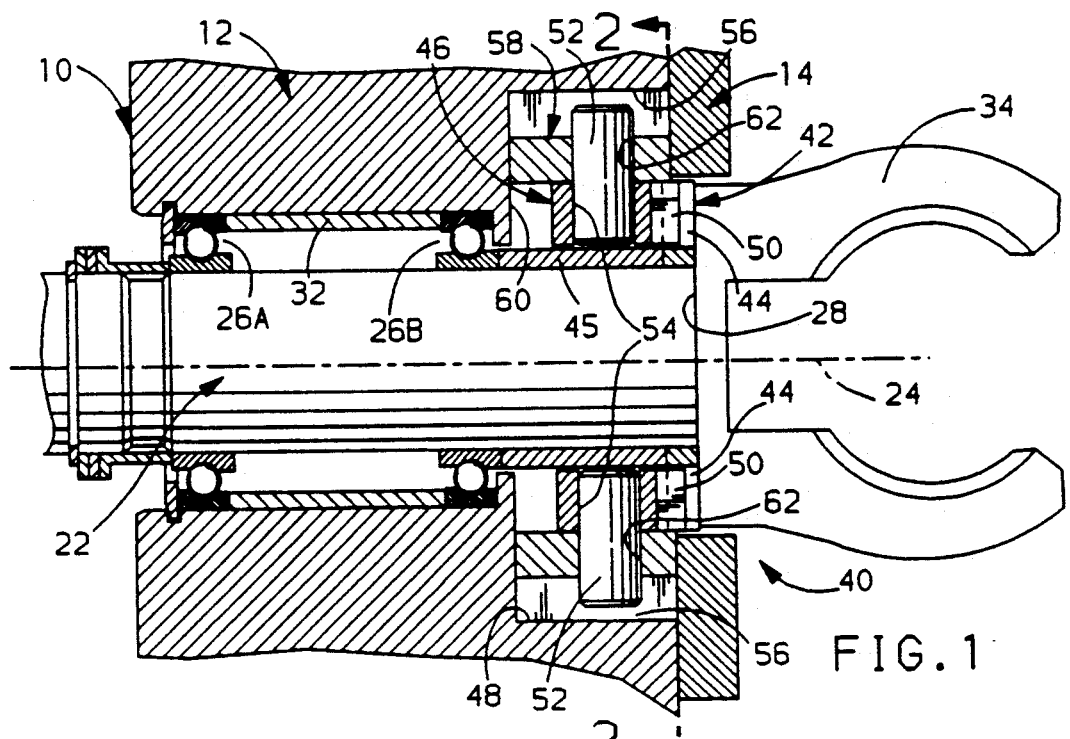
FIG. 1 is a fragmentary, partially broken-away, side elevational view of an automotive steering column having an anti-theft steering shaft lock according to this invention.
Figure 3:
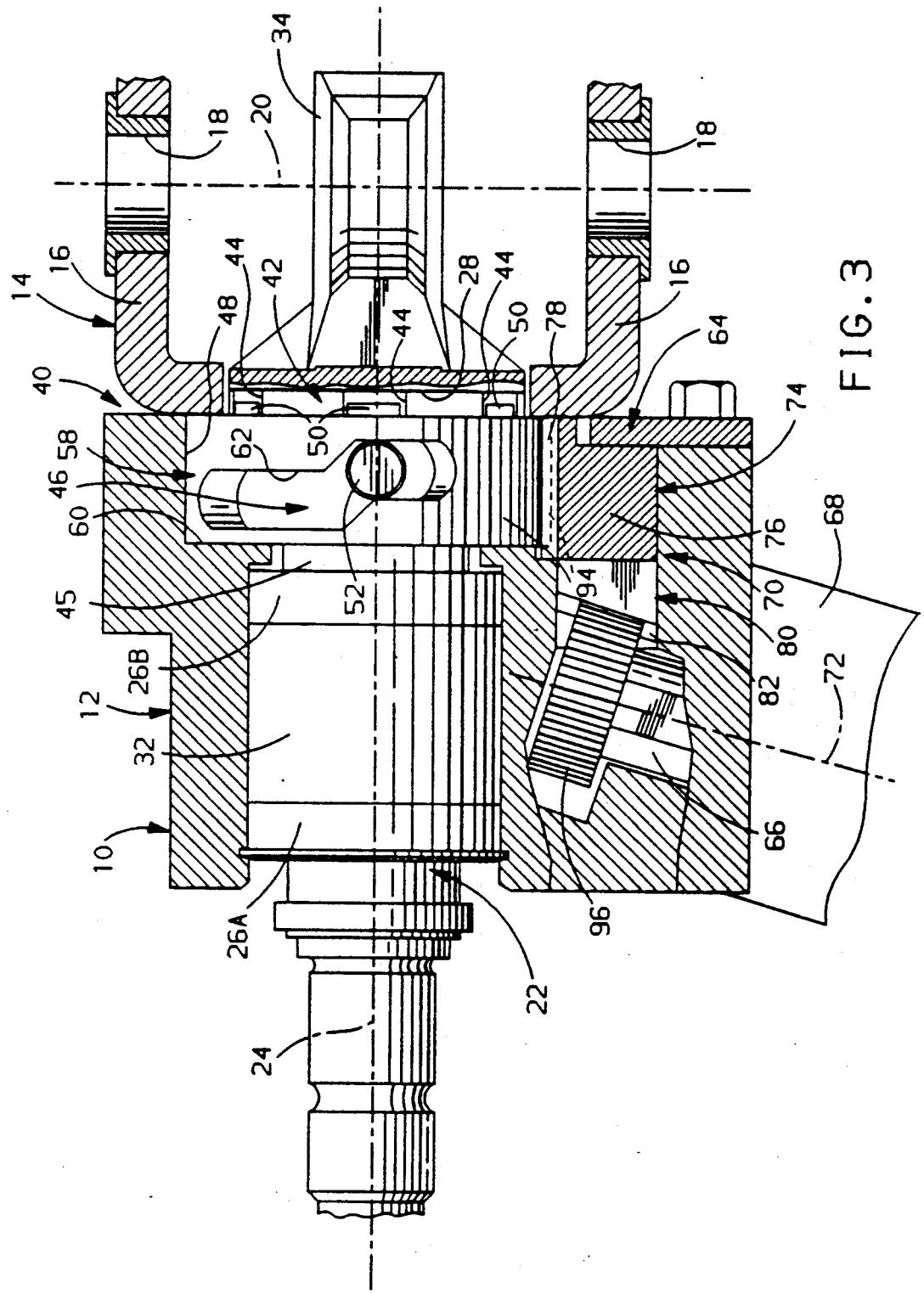
FIG. 3 is a sectional view taken generally along the plane indicated by lines 3—3 in FIG. 2.

Referring to FIGS. 1 and 3, a fragmentarily illustrated tilt-housing (10) of a tilt-adjustable automotive steering column, not shown, includes a bearing support (12) and a yoke (14) rigidly connected to the bearing support. The yoke (14) has a pair of bifurcated arms (16) and a corresponding pair of sleeve bearings (18) on the arms which receive trunnions, not shown, on a stationary mast jacket of the steering column whereby the tilt-housing is pivotable up and down about a generally transverse axis (20) of the steering column. U.S. Pat. No. 3,167,971, issued Feb. 2, 1965 and assigned to the assignee of this invention describes in more detail a representative tilt-adjustable steering column.

A steering shaft (22), having a longitudinal centerline (24), is rotatably mounted on the bearing support (12) by a pair of ball bearings (26A-B), FIG. 1, separated by a tubular spacer (32). The steering shaft has a yoke end (34) for universal joint attachment to a lower steering shaft, not shown, of the steering column and a serrated end (36) for rigid attachment of a steering wheel (38), FIG. 4. An anti-theft steering shaft lock (40) according to this invention on the tilt-housing (10) selectively rotatably immobilizes the steering shaft (22).

The anti-theft steering shaft lock (40) includes an annular first clutch element (42) disposed around the steering shaft (22) and abutting the annular shoulder (28). The first clutch element is welded or otherwise rigidly attached to the steering shaft and includes a plurality of angularly spaced notches (44) accessible in the direction of the centerline (24) of the steering shaft. The bearing (26B) is separated from the first clutch element by a tubular spacer (45).

Figure 2:
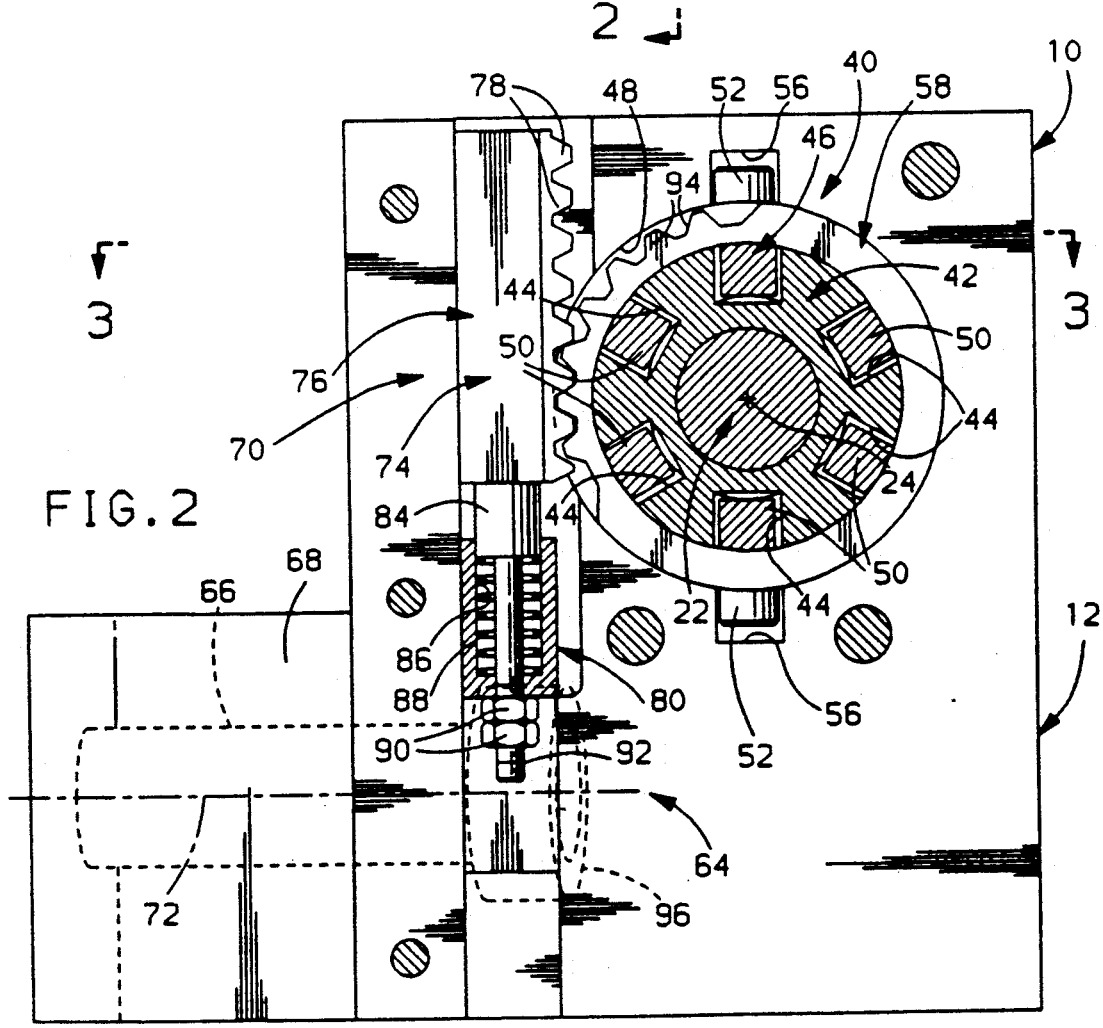
FIG. 2 is a sectional view taken generally along the plane indicated by lines 2—2 in FIG. 1.

An annular second clutch element (46) of the anti-theft steering shaft lock (40) is disposed around the first tubular spacer (30) in a cylindrical cavity (48) in the bearing support (12). The second clutch element is shiftable in the direction of the centerline (24) of the steering shaft toward and away from the first clutch element and includes a plurality of axial lugs (50) engageable in the notches (44) in the first clutch element in a locked position, FIGS. 1-3, of the second clutch element.

Figure 4:
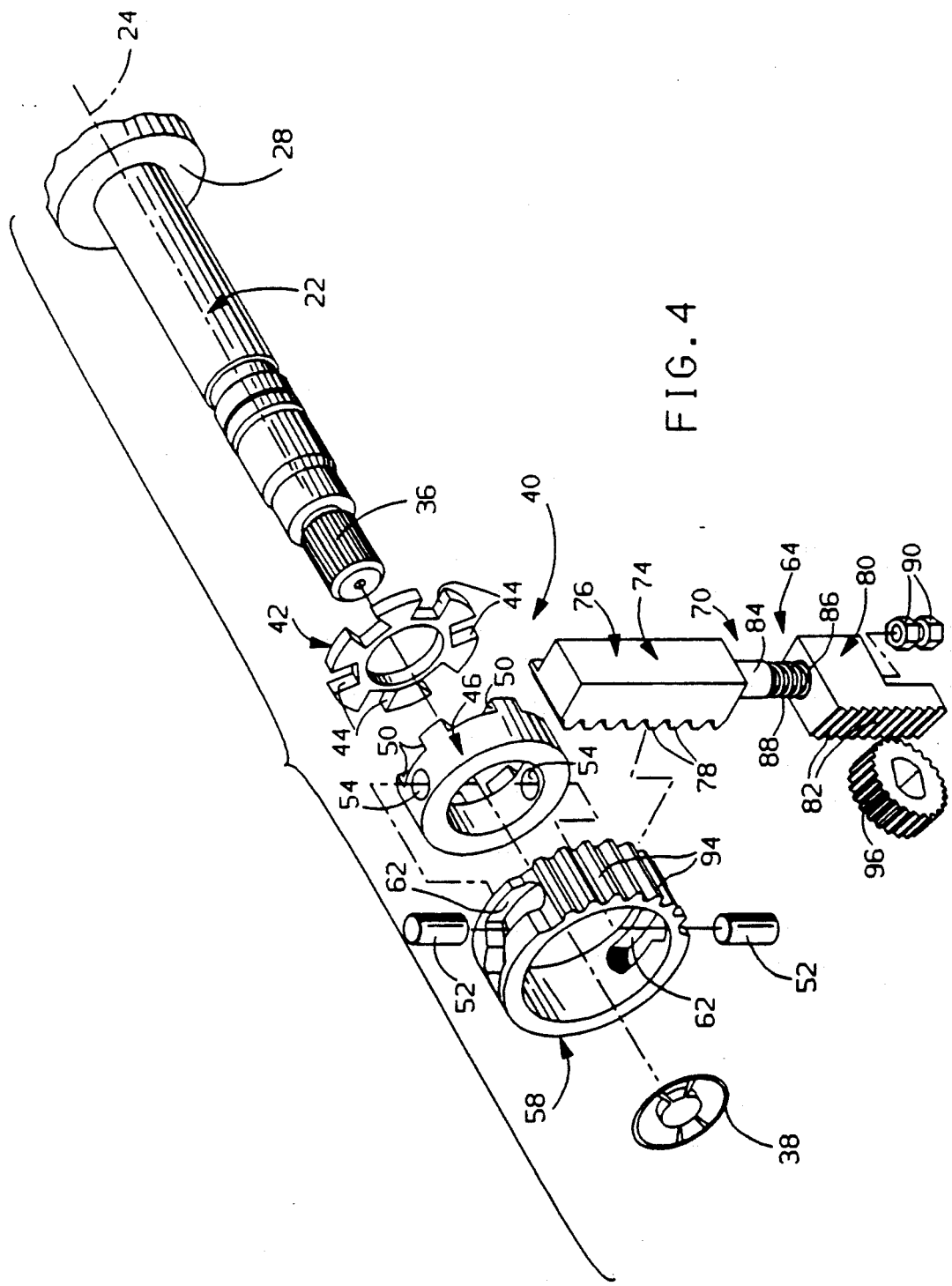
FIG. 4 is an exploded perspective view of the anti-theft steering shaft lock according to this invention.

A pair of radial lugs (52) are pressed into a corresponding pair of radial sockets (54), FIG. 4, in the second clutch element and are received in respective ones of a pair of slots (56) in the bearing support parallel to the centerline (24) of the steering shaft (22). The sides of the slots (56) engage the radial lugs to prevent rotation of the second clutch element relative to the bearing support without interfering with bodily movement of the second clutch element toward and away from the first clutch element. In the locked position of the second clutch element, the axial lugs (50) and the notches (44) cooperate in preventing rotation of the steering shaft relative to the bearing support.

The anti-theft steering shaft lock (40) further includes an annular control element (58) in the cavity (48). The control element is rotatable in the cavity (48) and axially captured between a wall (60) of the cavity (48) and a portion of the yoke (14). The control element has a pair of diametrically opposite, circumferential cam slots (62) therein. Each of the circumferential cam slots closely receives a corresponding one of the radial lugs (52) on the second clutch element.

The control element (58) is rotatable relative to the bearing support (12) between a first position corresponding an unlocked position, not shown, of the second clutch element (46) wherein the axial lugs (50) are separated from the notches (44) and a second position corresponding to the locked position of the second clutch element. The radial lugs function as followers relative to the cam slots (62) during rotation of the control element so that as the control element rotates back and forth between its first and second positions, the second clutch element is bodily shifted in the direction of the centerline (24) between its unlocked and its locked positions.

An actuating system (64) of the anti-theft steering shaft lock (40) includes a conventional cylinder lock (66) in a boss (68) on the bearing support, FIG. 3, and a double rack and pinion (70). The cylinder lock (66) has a barrel, not shown, rotatable about an axis (72) of the boss when a key, not shown, is inserted in a key slot in the barrel. The cylinder lock (66) also locks, unlocks and sequences the vehicle's ignition in the usual fashion so that the barrel has an OFF-LOCK position when the vehicle is unattended and a plurality of positions angularly spaced from the OFF-LOCK position and corresponding to the usual operating states of the vehicle's ignition such as OFF, ON, RUN and START.

The double rack and pinion (70) includes a two-piece rack bar (74) mounted on the bearing support (12) for transverse bodily movement relative to the axis of rotation (72) of the barrel of the cylinder lock and to the centerline (24) of the steering shaft. The rack bar has an upper part (76) with a plurality of rack teeth (78) thereon and a lower part (80) with a plurality of rack teeth (82) thereon. A stem (84) of the upper part is slidable in a bore (86) in the lower part, FIGS. 2 and 4. A spring (88) urges relative separation between the upper and lower parts and a pair of retaining nuts (90) on a threaded post (92) on the upper part prevents the spring from dislodging the upper part from the lower part.

The rack teeth (78) on the upper part (76) of the rack bar mesh with a plurality of pinion gear teeth (94) on an outside diameter of the control element (58). The rack teeth (82) on the lower part (80) of the rack bar mesh with a plurality of pinion gear teeth on a pinion gear (96) rotatable as a unit with the barrel of the cylinder lock (66). Rotation of the pinion gear (96) effects up and down bodily movement of the lower part (80) of the rack bar and, through the spring (88), up and down bodily movement of the upper part (76) of the rack bar. Bodily movement of the upper part of the rack bar effects rotation of the control element (58).

The anti-theft steering shaft lock (40) operates as follows. In the OFF-LOCK position of the cylinder lock barrel, the control element is in its second position, the second clutch element is in its locked position, and the steering shaft (22) is rotatably immobilized relative to the bearing support (12) to render the vehicle effectively unsteerable and, therefore, undriveable. When the cylinder lock barrel is rotated out of its OFF-LOCK position by a key, the pinion gear (96) shifts the rack bar (74) and the rack bar rotates the control element (58) from its second position to its first position. Concurrently, the control element shifts the second clutch element from its locked position to its unlocked position to release the steering shaft in all positions of the cylinder lock barrel except OFF-LOCK.

To once again immobilize the steering shaft (22), the cylinder lock barrel is turned back to OFF-LOCK. Concurrently, the rack bar (74) rotates the control element (58) from its first position to its second position to shift the second clutch element from its unlocked position to its locked position. If the axial lugs (50) on the second clutch element are precisely aligned with the notches (44) on the first clutch element (42), movement of the second clutch to its locked position is unimpeded.

If the first clutch element interferes with the axial lugs on the second clutch element, then the spring (88) compresses to accommodate lost motion between the momentarily immobilized control element (58) and the pinion gear (96) which continues to rotate as the cylinder lock barrel is rotated all the way to its OFF-LOCK position. The spring (88) remains in a state of heightened compression until the steering wheel (38) is rotated to effect alignment of the notches (44) with the axial lugs (50). Then, with the control element free to rotate all the way to its second position, the spring (88) extends the upper part (76) of the rack bar (74) to effect that amount of rotation of the control element.

The axial lugs (50) may have side angles, not shown, which, when coordinated with the configuration of the cam slots (62) and with the spring rate of the spring (88), may limit the torque capacity of the anti-theft steering shaft lock (40) to foreclose over-torque destruction of the lock. For example, by appropriate coordination of the aforesaid variables, the first clutch element (42) can be made to back drive the second clutch element (46) in the direction of the centerline (24) at a predetermined level of applied torque at the steering wheel (38). Concurrently, the second clutch element back drives the control element from its second position toward its first position and the pinion teeth (94) shift the upper part (76) of the rack bar (74) against the spring (88). When the torque is removed or the axial lugs (50) achieve registry with succeeding ones of the notches (44), the spring (88) expands and engages the axial lugs and the notches. The level of torque required to effect rotation of the steering wheel in the OFF-LOCK position of the cylinder lock barrel is sufficient to maintain the vehicle in effectively unsteerable condition.

The embodiments of the invention in which an exclusive property or privilege is claimed are defined as follows:

1. In a steering column having a support and a steering shaft rotatably mounted on said support,
  an anti-theft steering shaft lock comprising:
  a first clutch element rigidly connected to said steering shaft having a notch means accessible in the direction of a longitudinal centerline of said steering shaft,
  a second clutch element having an axial lug means thereon,
  means mounting said second clutch element on said support for bodily shiftable movement in the direction of said centerline of said steering shaft between a locked position wherein said axial lug means engages said notch means to prevent relative rotation between said first and said second clutch elements and an unlocked position wherein said axial lug means is remote from said notch means,
  an anti-rotation means between said support and said second clutch element operative to prevent rotation of said second clutch element relative to said support,
  an annular control element mounted on said support for rotation between a first position corresponding to said unlocked position of said second clutch element and a second position corresponding to said locked position of said second clutch element,
  a cam means between said control element and said second clutch element operative to move said second clutch element between said unlocked and said locked positions thereof concurrently with rotation of said control element between said first and said second positions thereof, and an actuating system on said support operative to rotate said control element between said first and said second positions thereof.

2. The anti-theft steering shaft lock recited in claim 1 wherein said anti-rotation means includes, means on one of said support and said second clutch element defining a plurality of slots parallel to said centerline of said steering shaft, and means on the other of said support and said second clutch element defining a corresponding plurality of radial lugs slidably received in respective ones of said slots.

3. The anti-theft steering shaft lock recited in claim 2 wherein said plurality of slots are in said support, and said radial lugs are on said second clutch element.

4. The anti-theft steering shaft lock recited in claim 3 wherein said cam means includes a circumferential slot in said annular control element closely receiving said radial lug on said second clutch element.

5. The anti-theft steering shaft lock recited in claim 4 wherein said actuating system includes a rack bar mounted on said support for bodily shiftable movement having a first plurality of rack teeth on a first part of said rack bar and a second plurality of rack teeth on a second part of said rack bar, a pinion gear rotatably mounted on said support and meshing with said second plurality of rack teeth on said second part of said rack bar, means defining a plurality of pinion gear teeth on said control element meshing with said first plurality of rack teeth on said first part of said rack bar, and a cylinder lock means on said support operative to selectively rotate said pinion gear.

6. The anti-theft steering shaft lock recited in claim 5 further including means on said rack bar operative to connect said first part thereof to said second part thereof for relative bodily shiftable movement, a spring on said rack bar urging relative separation between said first part of said rack bar and said second part of said rack bar, and retaining means operative to prevent said spring from dislodging said first part of said rack bar from said second part of said rack bar.

* * * * *